United States Patent [19]

Broecker et al.

[11] 3,996,174

[45] Dec. 7, 1976

[54] PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

[75] Inventors: Bernhard Broecker, Hamburg; Richard Schardt, Oststeinbek, both of Germany

[73] Assignee: Hoechst Aktiengesellschaft, Germany

[22] Filed: May 15, 1974

[21] Appl. No.: 469,955

[30] Foreign Application Priority Data

Mar. 9, 1974    Germany .......................... 2411368

[52] U.S. Cl. .................... 260/23.7 A; 106/95; 106/109; 106/131; 106/142; 106/131; 106/159; 106/215
[51] Int. Cl.² ...................................... C08L 91/00
[58] Field of Search ............... 260/23.7 A, 23.7 R; 106/131, 95, 109, 142, 159, 215

[56] References Cited

UNITED STATES PATENTS

| 3,518,213 | 6/1970 | Miyoshi | 260/23.7 A |
| 3,681,276 | 8/1972 | Nagahisa | 260/23.7 A |
| 3,689,446 | 9/1972 | Furuya | 260/23.7 A |
| 3,789,046 | 1/1974 | Marl et al. | 260/23.7 A |

FOREIGN PATENTS OR APPLICATIONS 154,174    6/1969    United Kingdom

*Primary Examiner*—Donald E. Czaja
*Assistant Examiner*—William E. Parker
*Attorney, Agent, or Firm*—Gordon W. Hueschen

[57] ABSTRACT

The subject of the invention is a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process.

15 Claims, No Drawings

PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

BACKGROUND OF THE INVENTION

U.S. patent application Ser. No. 449,655, filed Mar. 11, 1974, now U.S. Pat. No. 3,944,512, issued Mar. 16, 1976 (priority: Switzerland: 3620/73 of Mar. 13, 1973) relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterised in that a mixture of:

a. 20–60% by weight of a polybutadiene having an average molecular weight of 750–2,000 and an iodine number between 300 and 450,
b. 10–60% by weight of a polyisoprene resin having a viscosity between 30 and 800 cP (measured in 70% strength solution in toluene at 20° C) and an iodine number between 160 and 400, and
c. 5–40% by weight of a fatty acid glyceride ester, wherein the fatty acid radical contains 16–18 C atoms and the fatty acid glyceride ester has an iodine number between 140 and 220, is pre-polymerised by heating to 200°–270° C until the reaction mixture of components (a), (b) and (c), which has an initial viscosity of about 100–300 sec (measured according to DIN 4 sec 53,211), displays viscosities between 500 and 2,000 sec (measured according to DIN 4 sec 53,211), the resulting mixture is then reacted with
d. 10–20% by weight of maleic anhydride at 180° to 190° C until no further free maleic anhydride is present and
e. in the resulting adduct the anhydride groups present are opened by hydrolysis with water or by alcoholysis with the amount of monohydric alcohols with 1–4 C atoms required to form the half-ester.

The process of U.S. patent application Ser. No. 449,655 gives heat-curable synthetic resins which can be diluted with water, are suitable for the electrophoretic coating process and are distinguished by very good resistance to salt spray, good throwing powers, good film hardness and low sensitivity of the rinsed, but not yet stoved, films to drops of water. However, a continuing disadvantage of the binders described in U.S. patent application Ser. No. 449,655 is that at high deposition potentials, say above 300 volt, the binders tend to excess-coating, that is to say coating thicknesses of 30 μ and above are obtained on the metal sheets to be coated.

An object of the present invention is to provide a process for the manufacture of synthetic resins of this type which when used as binders no longer show this disadvantage and which, for these reasons, are distinguished by even better values of the throwing power and excellent voltage resistance. This means that the breakdown voltage, measured in volt, during electrical deposition is relatively high. The binders manufactured according to the invention should be capable of deposition over a wide voltage range without a danger of excess-coating, that is to say in coating thickness of 20–22 μ.

In the process of the present invention, this is achieved by using, additionally to the components (a) to (d) of U.S. patent application Ser. No. 449,655, a component (f), which consists of an adduct of an $\alpha,\beta$-unsaturated aliphatic dicarboxylic acid to a resin acid, it being possible for these adducts to be partially or completely esterified with saturated polyhydric alcohols.

SUMMARY

The subject of the invention is a process for the manufacture of heat-curable synthetic resins, based on reaction products of maleic anhydride with mixtures of polybutydiene, unsaturated hydrocarbon resins and unsaturated fatty acid glyceride esters, which can be diluted with water and are suitable for the electrophoretic coating process, according to the U.S. patent application Ser. No. 449,655 wherein a mixture consisting of:

a. 20–60% by weight of a polybutadiene having an average molecular weight of 750–2,000 and an iodine number between 300 and 450,
b. 10–60% by weight of a polyisoprene resin having a viscosity between 30 and 800 cP (measured in 70% strength solution in toluene at 20° C) and an iodine number between 160 and 400, and
c. 5–40% by weight of a fatty acid glyceride ester, wherein the fatty acid radical contains 16–18 C atoms and the fatty acid glyceride ester has an iodine number between 140 and 220, is pre-polymerised by heating to 200°–270° C until the reaction mixture of components (a), (b) and (c), which has an initial viscosity of about 100 to 300 sec (measured according to DIN 4 sec 53,211), displays viscosities between 500 and 2,000 sec (measured according to DIN 4 sec 53,211), the resulting mixture is then reacted with
d. 10–20% by weight of maleic anhydride at 180°–190° C until no further free maleic anhydride is present and
e. in the resulting adduct the anhydride groups present are opened by hydrolysis with water or by alcoholysis with the amount of monohydric alcohols with 1–4 C atoms required to form the half-ester, characterised in that the reaction carried out to modify the process products, 5 to 25% by weight, relative to the total weight of the components (a), (b), (c) and (d), of adducts of $\alpha,\beta$-unsaturated aliphatic dicarboxylic acids to resin acids and/or adducts which are partially or completely esterified with polyhydric saturated aliphatic alcohols, are co-used as component (f).

The following may be mentioned as examples, to be used individually or as mixtures, of resin acids suitable for the synthesis of the adduct: Abietic acid, laevopimaric acid, neoabietic acid, and palustric acid, as well as partially hydrogenated abietic acid, such as dehydroabietic acid and dihydroabietic acid. However, the resin acids mentioned should still have an iodine number of at least 100.

Mixtures of natural resin acids, such as balsam colophony, pine balsam, root resin, tall resin and similar products, and their partial hydrogenation products, are also very suitable for the manufacture of the adducts.

Suitable $\alpha,\beta$-unsaturated dicarboxylic acids for the manufacture of the adducts are maleic acid, fumaric acid, aconitic acid, citraconic acid and their anhydrides, where they exist; maleic anhydride and fumaric acid are particularly preferred.

The molar ratio of the α,β-unsaturated dicarboxylic acid to the resin acid in the adduct lies within the limits of 0.2:1 to 1:1.

The polycarboxylic acids obtained by adduct formation between the resin acid and the α,β-unsaturated dicarboxylic acid or its anhydride can either be in the form of free polycarboxylic acids or they can also be employed partially or completely esterified with polyhydric aliphatic alcohols.

The following may be mentioned as examples of such polyhydric alcohols which are suitable for the esterification of the adducts: Glycerine, trimethylolpropane, pentaerythritol, 1,6-hexanediol and particularly -butanediol. Pentaerythritol and trimethylolpropane and particulary preferred.

The compounds employed as component (f) should have viscosities between 80 and 250 cP, measured at 50% strength in xylene at 20° C. The melting points of these products should lie in the range from 100° to 160° C.

In the preferred embodiment, the viscosities of the component (f) are between 120 and 180 cP, measured 1:1 in xylene at 20° C, and their melting point is between 100° and 130° C.

The component (f) can be added in accordance with different variants. Firstly, according to variant I, the component (f) can be added to the components (a) to (c) according to the process described in U.S. patent application Ser. No. 449,655, and can then be reacted further in accordance with the process of U.S. patent application Ser. No.

However, according to variant II, the component (f) can also be reacted according to stage (d) of U.S. patent application Ser. No. 449,655, together with the maleic anhydride.

In these cases, that is to say process variants I or II, the component (f) is preferably employed as the free polycarboxylic acid which is not esterified. In some cases it can also be possible to employ the component (f) in the esterified form, but in each case the increase in viscosity and the compatibility must be tested accurately during the reaction, that is to say the viscosity in stage (c) must not be higher than 2,000 sec (measured according to DIN 4 sec 53,211) has at least after stage (d), a resin which is very largely clear must have been produced. If these conditions are not fulfilled, the type and amount of the esterified component (f) employed is unsuitable for these process steps.

In a further process variant III, the component (f) can also be added only after the end of stage (e) according to the process indicated in U.S. patent application Ser. No. 449,655, in which case the component (f) is then incorporated into the synthetic resin by heating at temperatures between 80° and 150° C.

This process variant III is preferably employed if the component (f) is partially or completely esterified. If a partial ester is used, a reaction temperature range from 80° to 110° C is preferred.

The reaction in process variant III must be continued until a clear resin has been produced. The viscosities of the end products should be between 40 and 170 sec (DIN 4 sec 53,211) measured at 50% strength by weight in ethylene glycol monobutyl ether at 20° C.

In another process variant IV, a part of the component (a) is first pre-polymerised with the components (b) and (c), the remainder of the component (a) is then added to the prepolymer and after completion of stages (d) and (e) the product is reacted with the component (f) whilst heating at temperatures between 80° and 150° C.

Finally it is also possible, in a variant V, first to pre-polymerise a part of the component (a) and a part of the component (c) with component (d), then to add further amounts of component (a) and further amounts of component (c) to the pre-polymer and then to reaction the resin, after completion of stages (d) and (e), with the component (f) whilst warming at 80° to 150° C.

These two process variants IV and V are used preferentially when the proportion of the component (b) in the synthetic resin is to be between 5 and 15% by weight.

In the preferred embodiment of these two process variants (IV + V) the prepolymerisation of the component (b) with parts of the component (a) and (c) is carried out until a viscosity between 1,500 and 3.000 sec (DIN 4 sec 53,211) is reached.

A further embodiment of the process of the present invention is characterised in that the component (b) is employed in amounts of 5 to 15% by weight, based on the weight of the end product.

A further special embodiment of the process of the present invention according to variant I, II and III is characterised in that the component (a) is employed in amounts of 27–50% by weight, the component (b) is employed in amounts of 10–25% by weight, the component (e) is employed in amounts of 12–25% by weight, the component (d) is employed in amounts of 15–20% by weight and the component (c) is employed in amounts of 5–20% by weight, based on the weight of the end product.

A further special embodiment of the process of the present invention, according to variant IV or V, is characterised in that the component (a) is employed in amounts of 40–55% by weight, the component (b) is employed in amounts of 5–15% by weight, the component (c) is employed in amounts of 3–10% by weight, the component (d) is employed in amounts of 12–18% by weight and the component (f) is employed in amounts of 10–20% by weight based on the end product.

A further special embodiment of the process of the present invention, according to variant I or II, is characterised in that in each case the component (f) is employed in portions.

In the preferred embodiment, the components (a), (b), (c), (d) and (f) should be present in the following amounts in the end product:

Binder according to variant I, II and III
Component (a): 30 – 50% by weight,
Component (b): 10 – 30% by weight,
Component (c): 10 – 25% by weight,
(d): 12 – 18% by weight and
Component (f) 5 – 25% by weight.
Binder according to variant IV and V
Component (a): 40 – 60% by weight,
Component (b): 5 – 15% by weight,
Component (c): 5 – 15% by weight,
Component (d): 14 – 18% by weight and
Component (f): 10 – 20% by weight.

Manufacture of polyisoprene resin 1 (component b):

500 g of toluene are cooled to +5° C whilst stirring. 1,500 g of isoprene and a solution of 30 g of boron trifluoride in 800 g of toluene are added dropwise simultaneously thereto, the temperature not being allowed to rise above 10° C. The reaction is then allowed to continue for a further 3 hours at 10° C, and 100 g of sodium bicarbonate and 2 g of water are added. The mixture is then filtered and concentrated. 950 g of polyisoprene resin having a viscosity of 150 cP (measured at 70% strength by weight in toluene at 20° C) and an iodine number of 285 remain.

Manufacture of polyisoprene resin 2:

The procedure followed is as indicated in the preceding instruction for polyisoprene resin 1, except for the difference that the post-reaction time is shortened to 30 minutes at 10° C. 550 g of polyisoprene resin having a viscosity of 56 cP (measured at 70% strength by weight in toluene at 20° C) and an iodine number of 240 remain.

Adduct I of maleic acid and colophony

Commercially available adduct based on colophony/maleic anhydride, having a melting point of 140°–150°, an acid number of 270–290, a total iodine number of approx. 100 and a viscosity of 100–200 cP, measured at 50% strength in xylene at 20° C. Saponification number: 330–350. Commercially available under the name Granol 525.

Adduct II of fumaric acid and colophony

Commercially available adduct synthesised from 81% by weight of colophony, 13% by weight of pentaerythritol and 6% by weight of fumaric acid, having a melting point of 115°–118° C, an acid number of less than 20 and a viscosity of 200–300 cP, measured 1:1 in white spirit at 20° C.

EXAMPLE 1

500 g of a polybutadiene having an iodine number of 450 and an average molecular weight of approx. 1,400, with 65–75% of the double bonds having the 1,4-cis configuration, 25–35% having the 1,4-trans configuration and less than 1% having the 1,2-vinyl configuration, are mixed with 200 g of unsaturated polyisoprene resin 1 and 150 g of linseed oil and 150 g of adduct I. The viscosity of the mixture is 180 sec. The batch is heated at 250° C under an inert gas until the viscosity according to DIN 4 sec 53,211, is 960 sec. 175 g of maleic anhydride are then added all at once at 160° C and the temperature is kept at between 180° and 190° C until the content of free maleic anhydride is practically zero. 60 g of methanol and 0.5 g of triethylamine are then added at 80° C and the temperature is raised to 100° C for one hour. This opens the anhydride groups in the adduct. The synthetic resin is then diluted with ethylene glycol monoethyl ether to a solids content of 75% by weight.

EXAMPLE 2

500 g of a polybutadiene having an iodine number of 450 and an average molecular weight of approx. 1,400, with 65–76% of the double bonds having the 1,4-cis configuration, 25–35% having the 1,4-trans configuration and less than 1% having the 1,2-vinyl configuration, are mixed with 200 g of unsaturated polyisoprene resin I and 150 g of linseed oil. The viscosity of the mixture is 130 sec. The batch is heated to 250° C under an inert gas until the viscosity according to DIN 4 sec 53,211 is 920 sec. 175 g of maleic anhydridge and 100 g of adduct I are then added all at once at 160° C and the temperature is kept at between 180° and 190° C until the content of free maleic anhydride is practically zero. 60 g of methanol and 0.5 g of triethylamine are then added at 80° C and the temperature is raised to 100° C for one hour. This opens the anhydride groups in the adduct. The synthetic resin is then diluted with ethylene glycol monoethyl ether to a solids content of 75% by weight.

EXAMPLE 3

500 g of a polybutadiene having an iodine number of 450 and an average molecular weight of approx. 1,400, with 65–75% of the double bonds having the 1,4-cis-configuration, 25–35% having the 1,4-trans configuration and less than 1% having the 1,2-vinyl configuration, are mixed with 200 g of unsaturated polyisoprene resin 2 and 150 g of linseed oil. The viscosity of the mixture is 100 sec. The batch is heated to 250° C under an inert gas until the viscosity according to DIN 4 sec 53,211 is 800 sec. 200 g of maleic anhydride are then added all at once at 160° C and the temperature is kept at between 180° and 190° C until the content of free maleic anhydride is practically zero. 60 g of methanol and 0.5 of triethylamine are then added at 80° C and the temperature is raised to 100° C for 1 hour. This opens the anhydride groups in the adduct. 200 g of adduct II are then added. The mixture is kept at 120°–130° C until a clear solution has formed. The synthetic resin is then diluted with ethylene glycol monoethyl ether to a solids content of 75% by weight.

EXAMPLE 4

100 g of polybutadiene having an iodine number of 450 and an average molecular weight of 1,400 are mixed with 150 g of polyisoprene resin 2 and with 75 g of linseed oil. The batch is heated to 250°–270° C under an inert gas until the viscosity according to DIN 4 sec 53,211 is 2,500 sec. A further 500 g of the polybutadiene are added to this mixture. After mixing, 175 g of maleic anhydride are added at 160° C and the temperature is kept at between 180° and 190° C until the content of free maleic anhydride has fallen to zero. 50 g of methanol and 0.5 g of triethylamine are then added at 80° C and the temperature is raised to 100° C for 1 hour. 200 g of adduct II are added to this synthetic resin and the batch is warmed at 120°–140° C until a clear solution has been produced. The resin is then diluted with ethylene glycol monoethyl ether to a solids content of 70%.

EXAMPLE 5

100 g of polybutadiene having an iodine number of 450 and an average molecular weight of 1,400 are mixed with 100 g of polyisoprene resin 1 and with 50 g of linseed oil. The batch is heated to 250°–270° C under an inert gas until the viscosity according to DIN 4 sec 53,211 is 2,600 sec. A further 450 g of the polybutadiene and 125 g of wood oil are then added. After mixing, 175 g of maleic anhydride and 0.2 g of diphenylenediamine as the oxidation inhibitor are added at 160° C, and the mixture is kept at 180°–190° C until the content of free maleic anhydride has fallen to practically zero. 52 g of methanol are added at 80° C and the temperature is raised to 100° C for hour. After opening the anhydride groups, 200 g of adduct II are added and are kept at 120°–140° C until a clear solution has been produced. The resin is diluted with isopropanol to a solids content of 75%.

EXAMPLE 6

100 g of polyisoprene resin 1, 100 g of linseed oil and 75 g of adduct I are added to 500 g of a polybutadiene having an iodine number of 450 and an average molecular weight of 1,400. After mixing, the batch is heated to 250°–270° C under an inert gas, until the viscosity, according to DIN 4 sec 53,211 has risen to 2,200 sec. 175 g of maleic anhydride and a further 75 g of adduct I, as well as 0.2 g of diphenylenediamine as an oxidation inhibitor, are added, and the batch is heated to 180°–190° C until the content of free maleic anhydride has fallen to zero. 50 g of methanol are then added at 80° C and the temperature is raised to 100° C for 1 hour. The synthetic resin is diluted with ethylene glycol monoethyl ether to a solids content of 70%.

The synthetic resins according to Examples 1, 2 and 6, after neutralisation with ammonia, electrophoretic application in coating thicknesses of 20–22 μ and stoving (30 minutes at 180° C) give lacquer films with good corrosion resistance in the salt spray test, whilst the synthetic resins according to Examples 3, 4 and 5 give even better resistance to salt spray. All the electrophoresis baths are distinguished by excellent throwing powers, and no excess coating occurs even at deposition voltages above 300 V. At lower deposition voltages (160–220 V) good values of the throwing power are also still achieved.

Comparison experiment to demonstrate the technical advance achieved

The following lacquers were compared with one another
1. Synthetic resin 1 used as binder: According to Example 1 of U.S. patent application Ser. No. 449,655,
2. Synthetic resin 2 used as binder: According to Example 1 of the present invention,
3. Synthetic resin 3 used as binder: According to Example 3 of the present invention, The binders were pigmented with a mixture of equal parts of titanium dioxide and aluminium silicate and a little carbon black, in the pigment/binder ratio of 0.3:1, and after neutralisation with ammonia were diluted with a solids content of 13% by weight. The values of the throwing power at various voltages were determined.

|  | Throwing power at 150 V | Throwing power at 200 V | Throwing power at 350 V |
| --- | --- | --- | --- |
| Binder 1 | 22/6/0 | 24/7/0 | 28/22/9 |
| Binder 2 | 18/15/4 | 18/16/7 | 20/20/17 |
| Binder 3 | 19/14/5 | 20/15/9 | 20/20/18 |

The throwing powers were measured in accordance with the following method:

A 50 cm long, 5 cm wide steel strip is introduced into a plastic tube of 6 cm diameter which carries a disc-shaped copper cathode at the bottom, in such a way that the distance to the cathode is 2 cm.

The deposition is carried out at various electrical voltages.

The coating thickness at 2, 15 and 45 cm distance from the lower edge is measured.

It can be seen from the table that with the binders of the present invention acceptable throwing powers are achieved even at voltages around 200 volt and that even at high voltages no excess-coating takes place, that is to say the binders can be employed over a wide voltage range and even if the coating time is extended there is no danger of overcoating.

EXAMPLE 7

The procedure in Example 3 is followed but instead of methanol isopropanol is used to open the anhydride groups.

EXAMPLE 8

The procedure in Example 3 is followed but instead of methanol ethanol is used to open the anhydride groups.

EXAMPLE 9

The procedure in Example 3 is followed but instead of methanol isobutanol is used to open the anhydride groups.

EXAMPLE 10

The procedure in Example 3 is followed but instead of methanol sec.-butanol is used to open the anhydride groups.

EXAMPLE 11

The procedure in Example 3 is followed but instead of methanol n-butanol is used to open the anhydride groups.

We claim:
1. Process for the manufacture of a heat-curable synthetic resin, based on a reaction product of maleic anhydride with a mixture of polybutadiene, unsaturated hydrocarbon resin and an unsaturated fatty acid glyceride ester, which can be diluted with water and is suitable for the electrophoretic coating process wherein a mixture consisting of:
   a. 20–60% by weight of a polybutadiene having an average molecular weight of 750–2,000 and an iodine number between 300 and 450,
   b. 10–60% by weight of a polyisoprene resin having a viscosity between 30 and 800 cP, measured in 70% strength solution in toluene at 20° C, and an iodine number between 160 and 400, and
   c. 5–40% by weight of a fatty acid glyceride ester, wherein the fatty acid radical contains 16–18 C atoms and the fatty acid glyceride ester has an iodine number between 140 and 220, is pre-polymerized by heating to 200°–270° C until the reaction mixture of components (a), (b) and (c), which has an initial viscosity of about 100 to 300 sec., measured according to DIN 4 sec., 53,211, displays viscosities between 400 and 2,000 sec., measured according to DIN 4 sec., 53,211, the resulting mixture is then reacted with
   d. 10–20% by weight of maleic anhydride at 180°–190° C until no further free maleic anhydride is present, and
   e. in the resulting adduct the anhydride groups present are opened by hydrolysis with water or by alcoholysis with the amount of $C_1$ to $C_4$ of monohydric alcohols required to form the half-ester, characterized in that the reaction is carried out to modify the process product by co-using as component (f), 5 to 25% by weight, relative to the total weight of the components (a), (b), (c) and (d), of an adduct of an α,β-unsaturated aliphatic dicarboxylic acid to a resin acid or an adduct which is partially or completely esterified with a polyhydric saturated aliphatic alcohol.

2. Process according to claim 1, characterised in that the component (f) is reacted conjointly with the components (a), (b) and (c).

3. Process according to claim 1, characterised in that the component (f) is reacted conjointly with the maleic anhydride.

4. Process according to claim 1, characterised in that the component (f) is reacted, after the hydrolysis or alcoholysis (reaction stage (e)) with the synthetic resin obtained (according to (a), (b), (c), (d) and (e)), by heating to temperatures between 80° and 150° C.

5. Process according to claim 1, characterised in that a part of the component (a) is pre-polymerised with the components (b) and (c), the remaining part of the component (a) is added to the pre-polymer and after completion of reaction ((d) and (e)) the component (f) is added to the synthetic resin obtained and is incorporated therein by heating to temperatures between 80° and 150° C.

6. Process according to claim 1, characterised in that a part of the component (a) and a part of the component (c) is pre-polymerised with the component (b), the remaining part of the component (a) and the remaining part of the component (c) is added to the pre-polymer and after completion of the reaction (d)) and (e)) the component (f) is added to the synthetic resin obtained and is incorporated therein by heating to temperatures between 80° and 150° C.

7. Process according to claim 2, characterised in that the component (f) is employed non-esterified, as the free polycarboxylic acid.

8. Process according to claim 3, characterised in that the component (f) is employed non-esterified, as the free polycarboxylic acid.

9. Process according to claim 4, characterised in that the component (f) is employed esterified.

10. Process according to claim 1, characterised in that abietic acid is employed as the resin acid.

11. Process according to claim 5, characterised in that the component (b) is employed in amounts of 5 to 15% by weight based on the weight of the end product.

12. Process according to claim 2, characterised in that the component (a) is employed in amounts of 27–50% by weight, the component (b) is employed in amounts of 10–25% by weight, the component (c) is employed in amounts of 12–25% by weight, the component (d) is employed in amounts of 15–20% by weight and the component (e) is employed in amounts of 5–20% by weight, based on the weight of the end product.

13. Process according to claim 4, characterised in that the component (a) is present in amounts of 40–55% by weight, the component (b) is present in amounts of 5–15% by weight, the component (c) is present in amounts of 3–10% by weight, the component (d) is present in amounts of 12–18% by weight and the component (f) is present in amounts of 10–20% by weight, based on the end product.

14. Process according to claim 1 wherein the resin acid is a natural resin acid or a partially hydrogenated resin acid.

15. Process according to claim 2 wherein component (f) is reacted in portions with a mixture of components (a), (b) and (c).

* * * * *

UNITED STATES PATENT OFFICE
CERTIFICATE OF CORRECTION

Patent No. 3,996,174                     Dated December 7, 1976

Inventor(s) Bernhard Broecker and Richard Schardt

It is certified that error appears in the above-identified patent and that said Letters Patent are hereby corrected as shown below:

Front cover of patent, Section [56] References Cited; the last reference "Marl et al" should be changed to read ---Heidel et al---.

Column 2, line 44; change "in that the" to read
---in that in the---.

Column 3, lines 13-15; delete in their entirety and rewrite as follows: ---pentaerythritol, 1,6-hexanediol and 1,4-butanediol. Pentaerythritol and trimethylolpropane are particularly preferred.---.

Column 3, line 31; change "Ser. No.     " to read
---Ser. No. 449,655.---.

Column 7, line 40; change "with a solids" to read ---to a solids---.

APPLICANTS' ERROR

Column 3, line 44; change "has at least after" to read
---so that at least after---.

Column 5, line 22; change "Granol 525." to read ---Gramal 525.---.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*